United States Patent Office 3,525,993
Patented Aug. 25, 1970

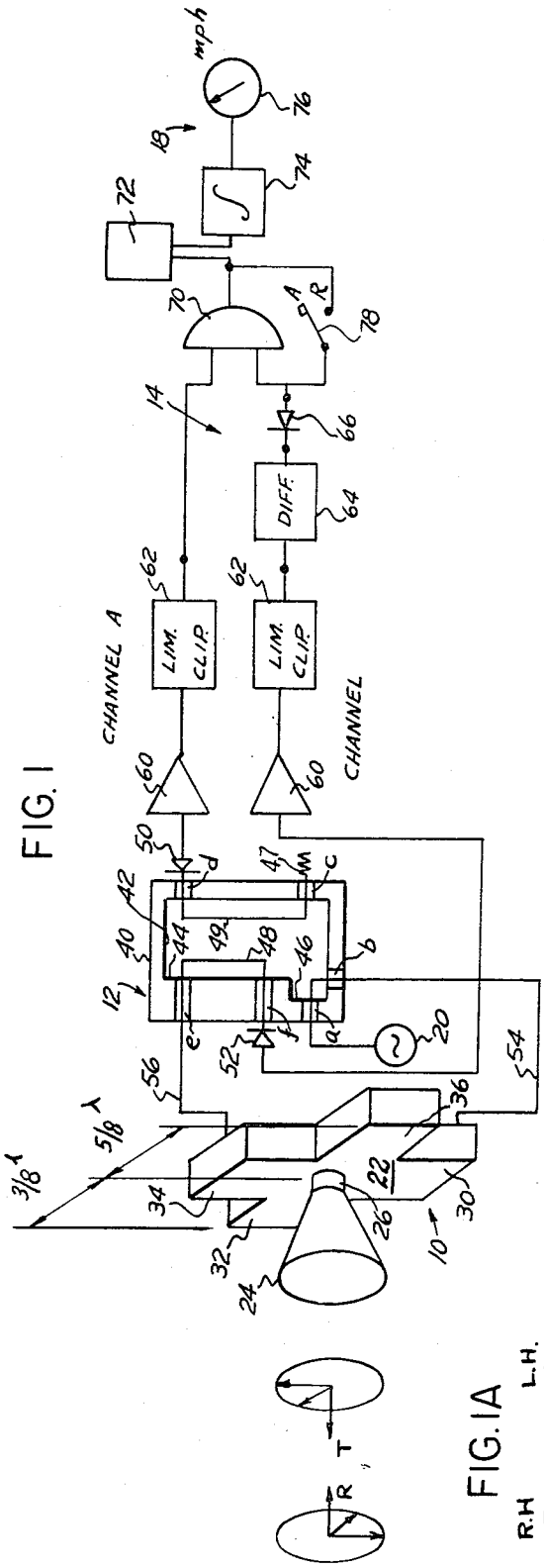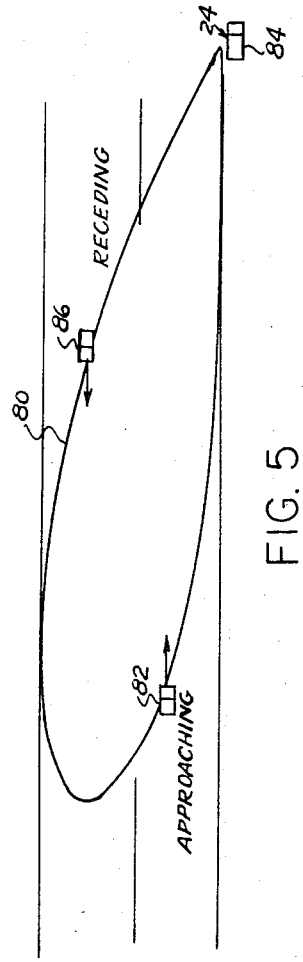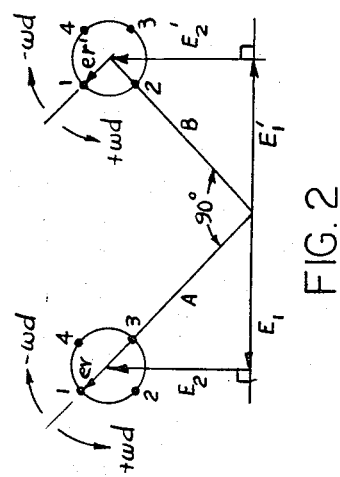

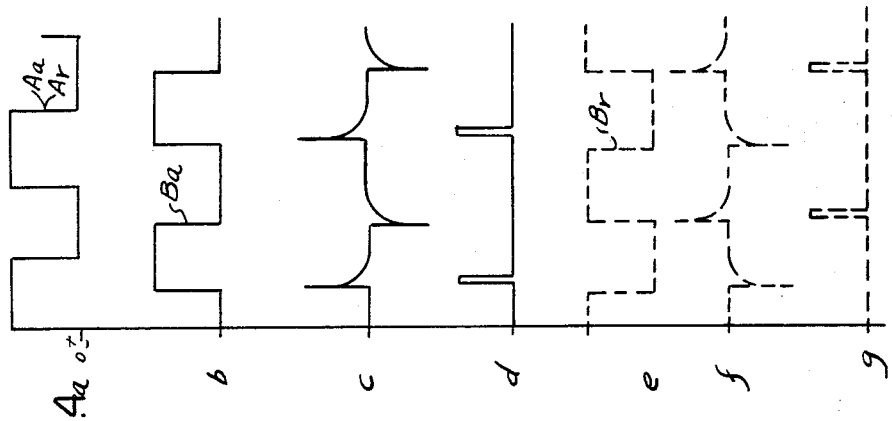
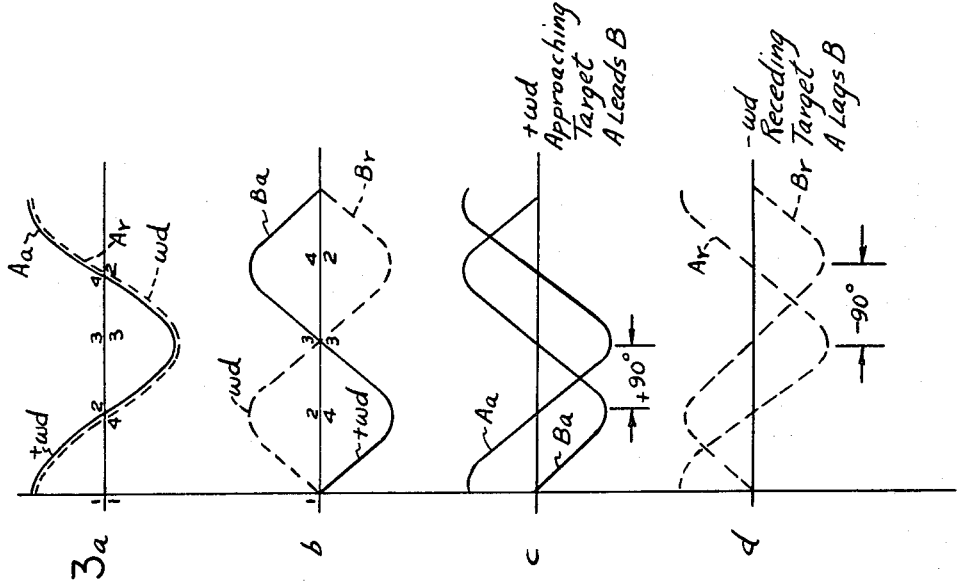

3,525,993
DIRECTION RESPONSIVE VEHICLE SPEED
MEASURING POLICE RADAR APPARATUS
George M. Peace, Oak Park, Julius Schiffman, Huntington Woods, and Zdzislaw I. Szewczyk, Warren, Mich., assignors to Chain Lakes Research Associates, Inc., Detroit, Mich., a corporation of Michigan
Filed May 3, 1968, Ser. No. 726,343
Int. Cl. G01s 9/50
U.S. Cl. 343—8
5 Claims

ABSTRACT OF THE DISCLOSURE

A directionally responsive vehicle speed measuring radar apparatus suitable for police or traffic enforcement purposes. The apparatus transmits and receives a high frequency beam of circularly polarized wave energy. A measuring station transmits to a target vehicle, which reflects and returns a portion of the beam energy transmitted, and derives from the returned energy a pair of low frequency signal components exhibiting different relative phase and variable frequency characteristics, which are related to the direction and to the speed of the target vehicle, the pair being used for selectively activating a phase responsive frequency measuring section of the apparatus.

BACKGROUND OF THE INVENTION

Field of the invention

This invention relates to apparatus for measuring the rate of relative movement, between a pair of objects and, more particularly, to vehicle speed measuring radar devices.

Description of the prior art

Prior art devices as employed in police radar applications commonly employ the Doppler principle in which the speed of a vehicle under surveillance is measured by the change in frequency between a transmitted high frequency radiant energy beam and the reflected beam returned from the target vehicle to the measuring station. When employed in a multiple target environment, such devices measure the speed of the vehicle providing the maximum or strongest return signal, and thus can erroneously assign the speed of a faster traveling vehicle passing through the beam pattern in an opposite direction to a slower traveling vehicle under surveillance. The foregoing deficiency obviously renders the utility of such devices of questionable value.

Prior art devices also rely upon the use of linearly polarized radio waves for transmission. The return signal reflected from the moving object is also linearly polarized. A major portion of the return energy is reflected from surrounding objects such as pavement, utility poles, etc.; subsequently, for each state of reflection, the energy changes phase. The vectorial sum of direct and scattered return signals therefore may vary at the detection point. This problem causes severe fading which results in a rapid variation of the indicating device typifying cases where the detected return is cancelled to give a zero reading.

Accordingly, the present invention has among its objects to provide improvements in apparatus of the above character providing reliable operation thereof under multiple target conditions.

A related object is to provide a vehicle speed measuring radar device incorporating a direction sensing capability therein and providing reliable operation over wide operating margins.

Another object is to provide a vehicle speed measuring radar device that discriminates against extraneous reflections to eliminate fading problems as encountered in prior systems.

DESCRIPTION OF THE DRAWINGS

FIG. 1 is a diagrammatic and single line representation of a directionally responsive vehicle speed measuring apparatus in accordance with the present invention;

FIG. 1a illustrates the polarization of the transmitted wave and of the components of the reflected associated with the apparatus of FIG. 1;

FIG. 2 is a vector diagram illustrating phase relationships of signal components appearing in the apparatus of FIG. 1;

FIGS. 3a–3d are curves illustrating the detected signal components and their phase relationships under different directional conditions occurring in the apparatus in FIG. 1;

FIGS. 4a–4g illustrate the nature and relationships of derived signal components at different points of the signal processing section of the apparatus of FIG. 1; and FIG. 5 represents the use of the apparatus of FIG. 1 in a multiple target environment.

DESCRIPTION OF THE PREFERRED EMBODIMENTS

Referring to the drawings, FIG. 1 is a single line diagrammatic representation of a directionally responsive vehicle speed measuring police radar apparatus in accordance with the invention and comprising a microwave transmit-receive section 10, a phase quadrature resolver and homodyne mixer detector section 12, a direction sensor or discriminator section 14, and a pulse frequency counting section 18.

The transmit-receive section 10 includes a high frequency source of power 20, a turnstile wave guide junction 22 and a conical horn antenna 24. The source 20 may be a Klystron oscillator supplying continuous wave energy of an arbitrarily selected frequency 10525.0 mc. The turnstile junction 22 comprises a pair of intersecting rectangular wave guides forming a cross with orthogonally oriented arms 30, 32, 34 and 36. Each of the arms is closed at one end opposite the center of the structure from which arms 32 and 36 measure ⅜ and ⅝ wave lengths, respectively. Arms 30 and 34, which are not of critical length, constitute the input and output ends of the turnstile 22. The turnstile 22 is excited from continuous wave energy supplied thereto from the Klystron oscillator 20, which is coupled to the input arm 30 thereof in a manner to induce electro-magnetic waves of the $TE_{01}$ mode therein.

The conical antenna radiator 24 is oriented with its axis normal to the plane of the turnstile 22 and is attached centrally thereof through a short cylindrical wave guide section 26. The cylindrical section 26 communicates interiorly with the turnstile 22 through a centrally located aperture therein for extracting wave energy therefrom and coupling wave energy thereto.

The quarter wave difference in length between the arms 32 and 36, which are orthogonally oriented relative to the arms 30 and 34, introduces a 90 degree phase difference in both time and space between the polarization of the electric fields of the waves induced in the structure. The structure thus converts or transforms the linearly polarized excitation energy applied thereto to circularly polarized output form that is propagated therefrom through the horn antenna 24 as a rotating electro-magnetic field with a resultant electrical field or polarization vector rotating in a clockwise (right hand) or counter-clockwise (left hand) direction. Conversely, the described apparatus is responsive to returned wave energy that is circularly polarized in a direction opposite the direction of rotation of the electric field polarization vector of the wave transmitted therefrom.

As illustrated in FIGS. 1 and 1a, for example, a transmitted wave T is represented as being of a counter-clockwise ro left-hand circular polarization. A reflected wave R is returned with both a left-hand and a right-hand component, but the system is selectively responsive to only one component and will selectively pass only the clockwise or right-hand circular polarization component under the conditions stated.

The phase quadrature resolver and mixer detector section 12 derives a pair of quadrature phase or time displaced reference local oscillator signals of the frequency of the oscillator 20 from a part of the energy supplied therefrom and combines or mixes these signals in a pair of detectors to each of which the reflected wave signal is also applied. The device produces a detected pair of output signals which are displaced ±90 degrees in time phase relationship and are of a frequency corresponding to the difference between the oscillator and the received signal frequencies.

As employed herein, the resolver 12 comprises a 3 db microwave hybrid coupler 40 formed of a retangular block of conducting material having a removable cover plate (not shown) and containing a plurality of ports, labelled $a$–$f$. The ports $a$–$f$ communicate with an internally formed cavity 42. The spacing between offset side walls 44 and 46 of cavity 42, is one quarter wave length in order to introduce a 90° phase shift or lag in the path of the wave travelling line element 48 from port $e$ to $f$.

The output of Klystron generator 20 is supplied to the input arm 30 of the turnstile junction 22 through the entry and the exit ports $a$ and $b$ of the coupler 40, as shown, where a small part, approximately —22 db, of the Klystron power output is directionally coupled to a line element 49. The line element 49 is connected at one end to the cathode of a crystal 50 in an output channel A and at its other end to an RF (impedance matching) load 47. Half or 3 db of the power induced in the line element 49 is coupled therefrom into the line element 48 for application to the cathode of a crystal 52 connected in an output channel B. The coupler 40 characteristically introduces a 90° phase lag or delay between the energy coupled from the one line element 49 to the other 48, while the increased distance of wave travel in the length of line element 48, owing to the greater wall thickness thereof, introduces still another 90° time phase lag therein. Thus, voltage vectors $E_1$ and $E_1'$ for the component of power directly coupled from the oscillator 20 and appearing at the crystals 50 and 52 are 180° out of phase, as shown in FIG. 2.

Similarly, leakage power of a level adjusted to correspond to the level of power directly coupled from the oscillator 20 and corresponding in frequency thereto is supplied from the output end in the arm 34 of the turnstile 22 to the port $e$ of the hybrid coupler 40. The leakage power is returned to the coupler 40 through a length of coaxial coupling line 56 corresponding in length to an integral multiple number of half wavelengths of the input coaxial line 54 over which the input power is supplied to the turnstile junction 22 from the oscillator 20 through the hybrid coupler 40.

Half of the leakage energy is coupled from the line element 48 to the element 49 with a 90° phase lag introduced into the line element 49 presented to the crystal 50. The remaining half of this component of leakage power is presented to the crystal 52 after a 90° phase lag introduced therein by the added quarter wavelength of the wall thickness associated with the line element 48. Thus, the voltage vectors $E_2$ and $E_2'$ for the component of leakage oscillator power coupled from the output of the turnstile junction 22 and appearing at crystals 50 and 52 are of the same phase relationship, but are displaced 90° from the vectors $E_1$ and $E_1'$, as shown in FIG. 2. The signals resulting from the above components of direct and leakage oscillator power combine vectorially to produce a pair of quadrature time displaced reference local oscillator signals, $E_A$ and $E_B$. These signals are presented to the crystals 50 and 52, respectively to be mixed with the signal, which results from the beam echo returned to the conical horn antenna 24 and is supplied from the output of the turnstile junction 22 to the crystals 50 and 52 through the hybrid coupler 40.

Depending upon whether the reflected wave is returned from an approaching or receding target, i.e. the direction of movement of the object under surveillance relative to the direction of the wave transmitted from the measuring or surveillance station, the received signal resulting from the portion of the returned wave intercepted by the antenna will be displaced or shifted in frequency above or below the frequency of the transmitted wave in accordance with the well known Doppler principle.

The received signal resulting from the returned wave, R, is presented to the crystals 50 and 52 where it is mixed with the reference local oscillator signals $E_A$ and $E_B$ and detected to produce a low frequency signal at the output of each of the crystals. The detected low frequency signal from the crystal 50 or the channel A will lead or lag the detected low frequency signal from the crystal 52 or the channel A by 90°, depending upon whether the reflected signal is of greater or lesser frequency than the oscillator frequency.

The foregoing effect is illustrated in FIGS. 2 and 3 in which the received signal derived from the reflected wave, R, and supplied through the coupler to the crystals 50 and 52, contains an additional component represented by the vectors $e_r$ and $e_r'$ rotating at the Doppler frequency rate ($wf_d$) in a clockwise or counterclockwise direction according to the direction (+ or —) of travel of the vehicle relative to the transmitted wave T, i.e., whether it is travelling in a closing target approaching direction or an opening target receding direction, respectively.

The detected signals appearing at the output of the channels A and B from the respective crystals, are illustrated in FIGS. 3a and 3b in which the Curves $Aa$ and $Ba$ represent the signals in the channels A and B for an approaching target and the dashed and dotted curves $Ar$ and $Br$, the signals in the channels A and B for a receding target. These curves are derived from observing the variations in the magnitude of the vectors resulting from the combining of the vector $e_r$ with $E_A$ and of the vector $e'_r$ with vector $E_B$ at timing points 1, 2, 3 and 4 for an approaching target and at points 1, 4, 3 and 2 for a receding target. The output of the channel A varies in the same manner for either an approaching or a receding target as indicated in FIG. 3a, while the channel B exhibits a 180° phase reversal in its output for these conditions, as indicated in FIG. 3b. FIGS. 3c and 3d illustrate the respective phase relationships between the signals of the channels A and B, with the signal in the channel A leading the signal in the channel B by 90° for an approaching target condition and the signal in the channel A, lagging the channel B by 90° for a receding target condition.

The detected outputs from the crystal detectors are thus supplied over the channels A and B to discriminator or direction sensing apparatus which determines which of the conditions of FIGS. 3c or 3d is presented or exists in the two channels. As illustrated in FIG. 1 each channel contains a low frequency amplifier 60 and a limiting clipper type amplifier 62, of which amplifier 60 is capable of amplifying frequencies in a range of 50 to 5,000 Hertz. Amplifier 62 limits and clips the amplitudes of the amplified signals from amplifier 60 to produce signals of nearly square wave form, as illustrated in FIGS. 4a, 4b and 4c. Channel B is structurally similar to channel A except that, in addition to the channel B amplifier 60 and the limiting amplifier 62, it further includes an R-C differentiator circuit 64 and a diode clipper 66, which serve to differentiate the pulse output from the channel B suring station and a target under surveillance, comprising the combination of:
- a generator of relatively high frequency electrical oscillations;
- a conical horn radiator antenna;
- a turnstile wave guide junction having an input and an output section, said input section coupling said conical horn radiator antenna and said generator for transmitting a beam of radiant energy of circular polarization from the measuring station toward the target, said output section in cooperation with said conical horn radiator antenna receiving a reflected beam of radiant energy of circular polarization from the target displaced in frequency by an amount corresponding to the rate of relative movement between the measuring station and the target;
- means coupled to said generator and to said output section of said turnstile wave guide junction for resolving energy derived therefrom into a pair of quadrature time phase related signal components, said resolving means comprising:
    - (a) a microwave hybrid coupler having an input terminal coupled to said generator for directionally coupling energy therefrom to said hybrid coupler;
    - (b) a second input terminal coupled to said output section of said turnstile wave guide junction for coupling leakage energy of the frequency of said generator to said hybrid coupler; and
    - (c) a pair of output terminals;
- a pair of detecting means each of which is connected to a different one of said pair of output terminals to receive a signal derived from the beam reflected to said turnstile wave guide junction from the target and a different one of said quadrature related signal components and developing a pair of output signals therefrom of a frequency corresponding to the difference in frequency between the transmitted and the reflected beam, said detected output signals having a first quadrature related phase difference therebetween for a target approaching the measuring station, and a second quadrature related phase difference therebetween for a target receding from the measuring station;
- phase discriminator means including coincident type pulse gating means having a pair of input terminals each connected to receive a different one of the output signals of said detecting means;
- gating means responsive only to detected output signals characterized by said first phase difference and providing a pulse output therefrom having a pulse repetition rate corresponding to the frequency difference between the transmitted and the reflected beams; and
- pulse repetition rate counting means connected to the output of said gating means, providing a measure of the pulse repetition rate of the pulse output therefrom as a measure of the speed of the target.

2. A directionally responsive vehicle speed measuring radar apparatus, comprising the combination of:
- a source of high frequency wave energy,
- transmitting-receiving means coupled to the source for transmitting a high frequency beam of circularly polarized wave energy from a measuring station to a target vehicle under surveillance and for receiving a reflected portion of the beam returned therefrom;
- first and second transmission elements,
- energy coupler means including a hollow member of conductive material having wall portions of unequal thickness and a plurality of ports extending through the wall portions,
- means for coupling the source to the energy coupling means,
- the first transmission element extending from the transmitting-receiving means through ports of a first wall thickness and the second transmission element extending through ports of a second wall thickness unequal to the first wall thickness, the energy coupler means serving to inductively couple the source and first and second transmission elements for deriving in said transmission elements a pair of low frequency signals at a frequency related to the speed of the target relative to the measuring station and exhibiting either of two different relative phase relationships in accordance with the direction of movement of the target relative to the measuring station,
- phase discriminator means connected to the first and second transmission elements and selectively responsive to derived low frequency signals exhibiting one of the said two different relative phase relationships and for emitting an output signal therefrom periodically varying at a rate corresponding to the frequency of said selected low frequency signal and
- frequency measuring means connected to said phase discriminator means to measure the frequency of the output signal therefrom as a measure of the speed of the target vehicle moving in a direction relative to the measuring station to provide a response to said phase discriminator means.

3. A directionally responsive vehicle speed measuring radar apparatus in accordance with claim 2 including switching means selectively operable to supply one of said derived low frequency signals to said frequency measuring means when the derived low frequency signals exhibit the other of said two different phase relationships as manifested by the failure of said phase discriminating means to provide a signal response therefrom for a vehicle within the transmitted beam.

4. A directionally responsive vehicle speed measuring radar apparatus, comprising the combination of:
- a source of high frequency wave energy;
- means coupled to said source for transmitting a high frequency beam of circularly polarized wave energy from a measuring station to a target vehicle under surveillance and for receiving a reflected portion of the beam returned therefrom;
- means coupled to said transmitting and receiving means for deriving a pair of low frequency signals therefrom of a frequency related to the speed of the target vehicle and exhibiting either one of two different relative phase relationships in accordance with the direction of movement of the target vehicle relative to the measuring station, including a microwave hybrid coupler coupled to said source and coupled to said means for receiving a reflected portion of the transmitted beam for coupling leakage energy of the frequency of the transmitted beam and output means for transmitting the energy received from said means for transmitting a high frequency beam displaced 90° in phase therefrom;
- phase discriminator means responsive to derived low frequency signals exhibiting one of the said two different relative phase relationships and emitting an output signal therefrom periodically varying at a rate corresponding to the frequency of said low frequency signals,
- and frequency measuring means connected to said phase discriminator means to measure the frequency of the output signal therefrom as a measure of the speed of the target vehicle moving in a direction relative to the measuring station to provide a response from said phase discriminator means.

5. An apparatus operable in a multi-target environment to measure the rate of relative movement between a measuring station and a target under surveillance comprising the combination of:
- a generator of relatively high frequency electrical oscillations;
- a conical horn radiator antenna;
- a turnstile wave guide junction having an input and an output section, said input section coupling said limiting amplifier 62, as shown in FIGS. 4c and 4f, and to pass differentiated signals of only one polarity therethrough, as shown in FIGS. 4d and 4g. The output of the limiting amplifier 62 of channel A and the output from the diode 66 of channel B are applied to the inputs of a double input logic type decision element, which, in accordance with one aspect of the present invention, comprises a pulse emitting coincident gate 70, such as an AND gate, which emits a pulse output therefrom when both of the inputs thereto are of the same logic level or polarity. As the pulse inputs to the gate 70 are derived from the Doppler frequency signals in channels A and B, the pulse output of the gate 70 will have a pulse repetition rate corresponding to the Doppler frequency and will vary correspondingly.

The output of the coincident gate 70 is applied to a pulse frequency or repetition rate counter section 18. In its simplest form the counter may comprise a one shot multivibrator 72 which is used to generate pulses of constant pulse width, an R-C integrating circuit 74 and an analog type D.C. measuring instrument device 76, such as a microammeter calibrated to provide a direct reading of target speed in miles per hour.

From examination of FIGS. 4a and 4b representing the outputs of amplifiers 62 in channels A and B for an approaching target condition, it will be seen that only the positive going differentiated outputs of channel B are passed by the diode 66 therein. The output of the diode occurs during the on time or the period when the output from channel A is high or is of the same polarity or logic level. Under these conditions, therefore, the gate elements 70 will emit an output pulse therefrom having a pulse repetition rate corresponding to the Doppler frequency.

Under receding target conditions, however, the outputs of amplifiers 62 in channels A and B are represented by the pulse forms of FIGS. 4a and 4e, wherein a pulse Br of FIG. 4e leads the pulse of FIG. 4a by 90° or a quarter period. After differentiation and detection, the output of channel B is represented by FIG. 4g and occurs during the off period of the pulse output of channel A of FIG. 4a, whereby the output of channel B is high when that of A is low. Therefore, the output from gate 70 remains low to prevent actuation or operation of the pulse frequency counter section.

In this manner, the disclosed speed measuring device is able to sense the direction of movement of a vehicle entering a transmitted beam pattern 80 shown in FIG. 5, and thereby avoids erroneously assigning the speed thereto of another object, which enters the beam pattern from the opposite direction and emits a stronger signal therefrom than the vehicle under surveillance. With reference to FIG. 5, for example, where a vehicle 82 under surveillance enters the beam pattern 80 emitted from a measuring or surveillance station 84 in a target approaching or closing direction and where another vehicle 86 enters or has entered the beam pattern 80 in the opposite or target receding direction, the beam echo reflected from the receding vehicle 86 will be stronger or of greater reflected intensity than that from the approaching vehicle 82, which is more distantly located from the station 84 than the receding vehicle 86. In the absence of any direction sensing capability, such apparatus would record and erroneously assign the speed of the receding target vehicle 86 to the approaching vehicle 82 under surveillance. The apparatus of the present invention, however, would reject reading of the speed of the vehicle 86 under these conditions.

In accordance with another aspect of the invention, where the vehicle 86 is the only vehicle entering or in the path of the beam pattern, the present apparatus is provided with the capability of measuring of such a receding target vehicle. For this purpose there is provided a manually or otherwise operable switch 78, which is actuated from its normally open position shown in FIG. 1 to close against a contact R thereof, thereby providing the output from one of the channels to operate the pulse counter section 18 under these conditions.

It will be appreciated from the foregoing that the direction sensing or discrimination capability of the subject apparatus is made possible by the resolution of the reference local oscillator signals into quadrature time phase related components and the combination therewith of the signal derived from the returned wave. For proper operation, it is necessary to have correct phasing between these signals applied to the mixer detector 12.

Furthermore, the signals comprising the return wave must be free of extraneous reflected energy in order that the true return signal strength be of sufficient magnitude to activate the speed reading.

Arising out of these considerations, the subject apparatus resorts to the use of a turnstile junction 22 in combination with a conical horn 24 to provide a means of adjusting the local oscillator signals transmitted to the mixer elements 12 and to realize the circularly polarized wave propagation and reception scheme described in order to avoid phasing differences between the primary reflected signals and extraneously reflected signals encountered with linearly polarized techniques.

When linearly polarized propagation and reception techniques are employed, the linearly polarized transmitted wave, upon reflection from an object, is decomposed or converted into both right hand and left hand circularly polarized components, which may be of different relative and varying phase relationship. The directional characteristics of the signal reflected from the object tend to be omnidirectional, or at least widely dispersed in spacial degrees. As a result, some energy is returned to the sensor from nearby objects, for example the road surface, which redirects the energy toward the sensor. The reception terminal of a linearly polarized system is responsive to both components of the return signal, and since these signals are not in phase, a phase error may exist which causes cancellation of the desired signal.

In the case of the circularly polarized wave propagation and reception system employed herein, the return signal is also decomposed into a right hand and a left hand component, as previously mentioned. Furthermore, a portion of this signal may be directed toward the sensor via extraneous reflections wherever the state of circular polarization would have changed. Since the microwave transmission and reception portion of the subject apparatus is responsive only to one of the reflected circularly polarized components of the returned wave, the phase thereof will not have extreme amplitude variations and will combine properly with the local oscillator signal in the detector, thereby assuring system reliability and stability over wider operating margins.

The subject system effectively reduces or eliminates the amount of extraneous reflections allowed to enter the sensing device, because the reception is sensitive to circularly polarized signals of the opposite sense of that transmitted. Therefore, fading is essentially eliminated.

It will be noted also that the manner of deriving the reference local oscillator signal and the quadrature related components thereof and the return signal through the use of the turnstile junction 22 and hybrid coupler 40, avoids the use of attenuators, which absorb power from the high frequency generating source 20 and reduce the power available for transmission from the system. Also, the use of the conical horn radiator 24 in lieu of the commonly employed parabolic antenna further results in improving the radiation efficiencies and consequently increases the transmitted power available from the system.

Having thus described our invention, what is sought to be protected by United States Letters Patent is as follows:

1. An apparatus operable in a multi-target environment to measure the rate of relative movement between a measconical horn radiator antenna and said generator for transmitting a beam of radiant energy of circular polarization from the measuring station toward the target, said output section in cooperation with said conical horn radiator antenna receiving a reflected beam of a radiant energy of circular polarization from the target displaced in frequency by an amount corresponding to the rate of relative movement between the measuring station and the target;

a microwave hybrid coupler having an input terminal coupled to said generator for directionally coupling energy therefrom to said hybrid coupler, having a second input terminal coupled to said output section of said turnstile wave guide junction for coupling leakage energy of the frequency of said generator to said hybrid coupler and a pair of output terminals for transmitting therefrom resulting energy derived from said hybrid coupler comprising a pair of quadrature time phase related signal components;

a pair of detecting means each of which is connected to a different one of said pair of output terminals to receive a signal derived from the reflected beam and a different one of said quadrature time phase related signal components, said pair of detecting means developing a pair of output signals therefrom of a frequency corresponding to the difference in frequency between the transmitted and the reflected beam, said detected output signals having a first quadrature related phase difference therebetween for a target approaching the measuring station and a second quadrature related phase difference therebetween for a target receding from the measuring station;

phase discriminator means responsive to derived detected output signals and emitting an output signal therefrom periodically varying at a rate corresponding to the frequency of said derived detected output signals; and frequency measuring means connected to said frequency discriminator means to measure the frequency of the output signal therefrom as a measure of the speed of the target moving in a direction relative to the measuring station to provide a response to said phase discriminator means.

References Cited

UNITED STATES PATENTS

| | | | |
|---|---|---|---|
| 2,645,769 | 7/1953 | Roberts | 343—8 |
| 2,965,898 | 12/1960 | Lewis | 343—100.3 |
| 3,024,456 | 3/1962 | Varian et al. | 343—9 XR |

RODNEY D. BENNETT, Primary Examiner

M. F. HUBLER, Assistant Examiner

U.S. Cl. X.R.

340—39; 343—9